(12) United States Patent
Rafalskyi et al.

(10) Patent No.: US 9,776,742 B2
(45) Date of Patent: Oct. 3, 2017

(54) DEVICE FOR FORMING A QUASI-NEUTRAL BEAM OF OPPOSITELY CHARGED PARTICLES

(71) Applicant: ECOLE POLYTECHNIQUE, Palaiseau (FR)

(72) Inventors: Dmytro Rafalskyi, Orsay (FR); Ane Aanesland, Paris (FR)

(73) Assignees: ECOLE POLYTECHNIQUE, Palaiseau (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/304,482

(22) PCT Filed: Apr. 14, 2015

(86) PCT No.: PCT/IB2015/052697
§ 371 (c)(1),
(2) Date: Oct. 14, 2016

(87) PCT Pub. No.: WO2015/159208
PCT Pub. Date: Oct. 22, 2015

(65) Prior Publication Data
US 2017/0036785 A1  Feb. 9, 2017

(30) Foreign Application Priority Data
Apr. 17, 2014 (FR) .................. 14 53469

(51) Int. Cl.
*B64G 1/40* (2006.01)
*F03H 1/00* (2006.01)
*H01J 27/16* (2006.01)

(52) U.S. Cl.
CPC ......... *B64G 1/405* (2013.01); *F03H 1/0025* (2013.01); *F03H 1/0087* (2013.01); *H01J 27/16* (2013.01)

(58) Field of Classification Search
CPC ......... B64G 1/405; F03H 1/00; F03H 1/0025; F03H 1/0087; G21K 5/00; G21K 5/02;
(Continued)

(56) References Cited

U.S. PATENT DOCUMENTS

| 2009/0189083 A1* | 7/2009 | Godyak | H01J 27/18 250/423 R |
| 2011/0163674 A1* | 7/2011 | Kaufman | H01J 27/16 315/111.51 |

(Continued)

FOREIGN PATENT DOCUMENTS

FR  2965697 A1  4/2012

OTHER PUBLICATIONS

Dudin, S.V., and Rafalskyi, D.V., "Empirical Laws of Particle Extraction From Single-Grid Source of Bipolar Ion-Electron Flow," Review of Scientific Instruments, American Institute of Physics 83(11):113302-1 to 113302-8, Nov. 27, 2012.

(Continued)

*Primary Examiner* — David E Smith
(74) *Attorney, Agent, or Firm* — Christensen O'Connor Johnson Kindness PLLC

(57) ABSTRACT

A device for forming a quasi-neutral ion-electron beam, including: a chamber; a set of means for forming an ion-electron plasma in the chamber; and means for extracting and accelerating charged particles from the plasma out of the chamber. The particles are capable of forming the beam and the extraction and acceleration means that include a set of at least two grids located at one end of the chamber.

17 Claims, 6 Drawing Sheets

(58) Field of Classification Search
CPC .... G21K 5/04; G21K 5/08; G21K 5/10; H01J 27/00; H01J 27/16
See application file for complete search history.

(56) References Cited

U.S. PATENT DOCUMENTS

2011/0277444 A1* 11/2011 Leiter .................... B64G 1/405
60/202
2013/0300288 A1* 11/2013 Aanesland ............ H01J 27/024
315/111.31

OTHER PUBLICATIONS

Rafalskyi, D., and Aanesland, A., "Coincident Ion Acceleration and Electron Extraction for Space Propulsion Using the Self-Bias Formed on a Set of RF Biased Grids Bounding a Plasma Source," Journal of Physics D: Applied Physics 47(49), Nov. 10, 2014, 9 pages.
International Search Report mailed Aug. 3, 2015, issued in corresponding International Application No. PCT/IB2015/052697, filed Apr. 14, 2015, 3 pages.
Written Opinion of the International Searching Authority mailed Aug. 3, 2015, issued in corresponding International Application No. PCT/IB2015/052697, filed Apr. 14, 2015, 7 pages.
International Preliminary Report on Patentability mailed Oct. 18, 2016, issued in corresponding International Application No. PCT/IB2015/052697, filed Apr. 14, 2015, 1 page.

* cited by examiner

DEVICE FOR FORMING A QUASI-NEUTRAL BEAM OF OPPOSITELY CHARGED PARTICLES

BACKGROUND

The invention relates to a device for forming a quasi-neutral beam of oppositely charged particles.

Such devices are notably used for plasma thrusters (application to satellites for correcting a trajectory, space probes, . . . ), devices for depositing particles on a target (vapor deposition, for example; field of microelectronics), devices for etching the target, devices for treating polymers or further devices for activating the target surface.

Typically, such a device comprises a chamber, means for introducing an ionizable gas into the chamber, means for ionizing the gas in order to form the plasma and means for extracting and accelerating charged particles from the plasma out of the chamber.

In the field of electric propulsion, there exist different techniques for ensuring the acceleration of the craft provided with the plasma beam generator, which is then assimilated to a plasma thruster.

Thus, for a plasma thruster, the plasma of which is formed with positive ions and electrons, it is possible to extract and only accelerate the positive ions out of the chamber and to ensure electro-neutrality of the beam of positive ions after leaving the chamber by injecting electrons downstream from the outlet of the chamber.

Ensuring the electro-neutrality of the beam at the outlet of the chamber is actually indispensable for avoiding that spacecraft be electrically charged, the current of the ion beam notably not being limited by the space charge.

This type of plasma thruster however has the drawback of applying an ancillary source of electrons for ensuring this electro-neutrality, an ancillary source which is generally the cause of a lack of reliability.

In order to ensure this electro-neutrality by increasing the reliability (therefore doing without the ancillary source of electrons), several routes have been contemplated.

A first route is to produce a plasma including positive ions, negative ions and electrons and to filter out the electrons, within the chamber, in order to only obtain at the outlet of the chamber or quasi only positive and negative ions. The oppositely charged particles of the beam are thus formed with positive ions and negative ions.

A second route is to produce a plasma including positive ions and electrons and to provide means for extracting and accelerating the positive ions and the electrons at the outlet of the chamber in order to ensure this electro-neutrality. The charged particles of the beam are thus formed with positive ions and electrons.

Solutions corresponding to the first described route above are proposed in documents WO 2007/065915, WO 2010/060887 or further WO 2012/042143.

All these solutions should apply an electronegative ionizable gas able to generate positive, negative ions and electrons as well as a means for filtering out the electrons in order to obtain at the outlet of the chamber only or practically only positive and negative ions.

In document WO 2007/065915, two grids 3, 4 in contact with the plasma are used as an extraction and acceleration means, which are located at the outlet of the chamber in a same plane (one at the top, the other one at the bottom) including one which is negatively biased and the other one is positively biased.

FIG. 1 is a representative diagram of the device proposed in WO 2007/065915. In this figure, the chamber 1 comprises a plasma with positive ions $A^+$, negative ions $A^-$, and electrons $e^-$. The means for filtering the electrons bears the reference 2.

Extraction and simultaneous acceleration of the positive and negative ions is thereby obtained, ensuring electro-neutrality of the ion beam after the outlet of the chamber.

However, this solution is delicate to apply because of the presence of grids having opposite biases. Indeed, the presence of these grids with opposite biases may imply significant curvatures of the beams stemming from each grid.

Document WO 2010/060887 proposes an improved solution as compared with the one of document WO 2007/065915, for which two different gases are provided instead of one in WO 2007/065915. One of these gases is electronegative and the other one may either be electropositive or electronegative.

In document WO 2012/042143, the application of an extraction and acceleration grid 5 is proposed, powered by an alternatively positive and negative voltage source, via the voltage source 6. With this grid 5 is associated another grid 7 which is connected to the ground 8.

When a positive potential is applied on the grid 5, the plasma potential becomes positive and the positive ions $A^+$ are accordingly accelerated towards the other grid 7 which is connected to the ground. Indeed, under these conditions, a positive sheath is formed at the grinds 5, 7, which allows acceleration of the positive ions. The sheath is a space which is formed between each grid 5, 7 and the plasma wherein the density of the positive ions differs from the density of the negative ions. Under these conditions, the extraction and acceleration of the negative ions is blocked.

Next, when a negative potential is applied onto the grid 5, the plasma potential becomes negative and the negative ions $A^-$ are accelerated towards the other grid 7. More specifically, after having applied a positive potential on the grid 5, the positive sheath disappears rapidly (about 1 microsecond) and a negative sheath is formed under the effect of the negative bias of this grid 5. Under these conditions, the extraction and the acceleration of the positive ions is blocked.

Depending on the bias of the grid 5, it is thus possible to accelerate and extract either the positive ions or the negative ions.

A representative diagram of the device proposed in document WO 2012/042143 is illustrated in FIG. 2 (a). The electronegative gas is noted as $A_2$ and the means for filtering the electrons 2. RF' designates here the means which allows generation of the plasma from the electronegative gas $A_2$ injected into the chamber 1. This is a source of an alternating sign-wave magnetic field emitting in the field of radiofrequencies.

Here, one does not have the drawback of having two oppositely biased grids, like in documents WO 2007/065915 and WO 2010/060887. However the positive ions $A^+$ and negative ions $A^-$ being extracted successively, optimization of the shape of the voltage signal generated by the alternating voltage source 6 connected to the grid 5 is proposed for ensuring at best the electro-neutrality of the ion beam at the outlet of the chamber. This alternating voltage source 6 may make use of the measurements of a probe S in the output beam and/or the RF' signal used for generating the plasma.

This optimized signal is illustrated in FIG. 2(b).

With this optimized signal, good electro-neutrality of the beam is obtained at the outlet of the chamber 1, but only on average.

Indeed, the fact of successively extracting the positive ions, and then the negative ions and vice versa does not always give the possibility of obtaining a constantly neutral beam. Accordingly, the potential of the thruster varies overtime, depending on the shape of the signal illustrated in FIG. 2(b).

Moreover, it should be noted that all the ion-ion extraction devices, the use of an electronegative gas, which is generally highly reactive (presence of fluorine, chlorine, . . . ) limits the lifetime of the device.

Further, the solutions proposed in documents WO 2007/065915 (FIG. 1), WO 2010/060887 and in FIGS. 2(a) and 2(b) (WO 2012/042143) are limited to the ion-ion extraction, but cannot be contemplated for extracting ions-electrons.

Another solution corresponding to the second route described above is proposed in the article of S. V. Dudin & D. V. Rafalskyki, "*On the simultaneous extraction of positive ions and electrons from single-grid ICP source*", A letters Journal Exploring the frontiers of Physics, EPL, 88 (2009) 55002, p 1-p 4.

This solution consists of applying an electrode 9 in the core of the chamber 1 (therefore within the plasma), the electrode 9 being powered by a radiofrequency voltage source 10 (RF; source of an alternating sign-wave voltage at a frequency comprised in the range of radiofrequencies) via a capacitor 11 and of associating with it a grid 7", located at the outlet of the chamber 1, in contact with the plasma and connected to the ground 8.

Reference may be made to FIG. 3, which is a representative diagram of the device. In this FIG. 3, RF' represents a radiofrequency source (for example one or several coils) for ionizing the gas and thereby forming a plasma including positive ions and electrons. The means 12 is a chamber in vacuo in which are installed means giving the possibility of characterizing the ion beam stemming from the chamber 1, which are not involved in the extraction and acceleration of the ions.

The operation of the device is the following.

By design, the electrode 9 has a clearly greater surface area than that of the grid 7" located at the outlet of the chamber 1 and connected to the ground 8.

Generally, applying an RF voltage on an electrode having a larger surface area than the grid 7" has the effect of generating at the interface between the electrode 9 and the plasma on the one hand, and at the interface between the grid 7" and the plasma on the other hand, an additional potential difference, which adds to the RF potential difference. This total potential difference is distributed on a sheath. Here, the sheath is a space which is formed between the grid 7" or the electrode 9 on the one hand and the plasma on the other hand wherein the density of positive ions is greater than the density of electrons. This sheath has a variable thickness because of the RF signal applied to the electrode.

In practice, the major portion of the effect of the application of an RF signal on the electrode 9 is however located in the sheath of the grid 7" (the electrode-grid system may be considered as a capacitor with two asymmetrical walls, in this case the potential difference is applied on the portion having the lowest capacitance therefore the smallest surface).

In the presence of the capacitor 11 in series with the RF source, 10, the application of the RF signal has the effect of converting the RF voltage into a constant DC voltage because of the charge of the capacitor 11, mainly at the sheath of the grid 7".

This constant DC voltage in the sheath of the grid 7" implies that the positive ions are constantly accelerated. Indeed, this DC potential difference has the effect of making the plasma potential positive. Accordingly, the positive ions of the plasma are constantly accelerated towards the grid 7" (at the ground) and extracted from the chamber 1 with this grid 7". The energy of the positive ions correspond to this DC potential difference (average energy).

The variation of the RF voltage, 10, gives the possibility of varying the RF+DC potential difference between the plasma and the grid 7". At the sheath of the grid 7", this is expressed by a time-dependent change in the thickness of this sheath. When this thickness becomes smaller than a critical value, which happens during a lapse of time with regular intervals given by the frequency of the RF signal, the potential difference between the grid and the plasma approaches the value zero (therefore the plasma potential approaches the value zero, the grid being at the ground), which gives the possibility of extracting electrons.

In practice, the plasma potential below which the electrons may be accelerated and extracted (=critical potential) is given by Child's law, which connects this critical potential to the critical thickness of the sheath below which this sheath disappears (sheath collapse).

As long as the plasma potential is less than the critical potential, then there is acceleration and simultaneous extraction of the electrons and of the ions.

Although the extraction of electrons is only conceivable over a certain lapse of time during a period of the RF signal applied to the electrode 9, this article shows the possibility of complete compensation for the positive charge of the ions and therefore good electro-neutrality of the beam at the outlet of the plasma chamber.

Moreover, quasi-simultaneous acceleration and extraction of the positive ions and of the electrons are obtained during a period of the RF signal, unlike the solution proposed in WO 2012/042143, whether for the ion-ion extraction or the ion-electron extraction.

The technique proposed in this article is therefore very different from the ones which are proposed in documents WO 2007/065915, WO 2010/060887, and WO 2012/042143 (notably that of FIG. 3, for the ion—electron extractions), by applying a single grid (grounded) in contact with the plasma and a capacitor 11, which provides a continuous component to the potential difference in the sheath, in series with an RF voltage source 10.

A drawback of this technique is that there is a lot of losses of accelerated positive ions, i.e. positive ions accelerated to a high energy, but which do not pass through the orifices of the grid. This causes more rapid wear of the grid and accordingly limits the lifetime of this grid. In the case of an application to a plasma thruster (satellite, space probe, . . . ), this drawback may become critical. In practice, in order to limit this drawback, ions therefore should be applied, for which the energy is less than 300 eV.

Moreover, this technique may not operate for the ion-ion extraction and acceleration.

SUMMARY

An object of the invention is to propose a device for forming a beam of positive ions and electrons having good electro-neutrality and improved extraction efficiency as compared with the known devices.

The efficiency improvement is notably expressed by a lifetime of the device which may be improved for a given extraction energy.

Another object of the invention is to propose such a device further capable of extracting ions with increased energy as compared with known devices.

In order to attain at least one of these objects, the invention proposes a device for forming a quasi-neutral beam of ions and electrons, comprising:
- a chamber,
- a set of means for forming an ion-electron plasma in this chamber;
- a means for extracting and accelerating charged particles of the plasma out of the chamber able to form said beam, said extraction and acceleration means comprising a set of at least two grids located at one end of the chamber;
- a radiofrequency alternating voltage source adapted for generating a signal for which the radiofrequency is comprised between the plasma frequency of the ions and the plasma frequency of the electrons, said radiofrequency voltage source being positioned in series with a capacitor and connected, through one of its outlet and through this capacitor, to at least one of the grids of said set of at least two grids, at least one other grid of said set of at least two grids being either set to a reference potential, or connected to the other one of the outlets of the radiofrequency voltage source.

This device may further comprise the following features, taken alone or as a combination:
- the set of means for forming the ion—electron plasma comprises one or several coils powered by a radiofrequency alternating voltage source;
- the radiofrequency voltage source powering said or each coil is the same one as the radiofrequency voltage source in series with the capacitor which are connected to at least one of the two grids, the device further comprising a means for handling the signal provided by said source towards said or each coil on the one hand and towards at least one grid on the other hand;
- the set of means for forming the ion—electron plasma in the chamber comprises a tank including at least one electropositive gas;
- the grids have circular orifices, the diameter of which is comprised between 0.5 mm and 10 mm, for example between 1 mm and 2 mm;
- the distance between both grids is comprised between 0.5 mm and 10 mm, for example between 1 mm and 2 mm;
- the grids have orifices with the shape of a slot;
- the electro-neutrality of the beam of ions and electrons is at least partly obtained by adjusting the period of application of the positive and/or negative potentials from the radiofrequency alternating voltage source;
- the electro-neutrality of the beam of ions and electrons is at least partly obtained by adjusting the amplitude of the positive and/or negative potentials from the radiofrequency alternating voltage source;
- the radiofrequency alternating voltage source is laid out so as to produce a rectangular signal;
- the radiofrequency alternating voltage source is laid out for producing a sign-wave signal.

A more complete object of the invention is to obtain a device which further allows extraction and acceleration of negative ions and of positive ions, while ensuring good electro-neutrality of the beam.

In order to attain this object, the invention also proposes a device for forming a quasi-neutral beam of oppositely charged particles, comprising:
- a device for forming a quasi-neutral beam of ions and electrons according to the invention;
- a set of means for forming an ion-ion plasma in the chamber, said set including a means for filtering out the electrons;
- a so called low frequency alternating voltage source which is adapted for generating a signal for which the radiofrequency is less than or equal to the plasma frequency of the ions;
- a means able to connect one of the grids either to the low frequency voltage source while activating the means for filtering out the electrons in order to form an ion-ion beam or, to the radiofrequency voltage source in series with the capacitor while deactivating the means for filtering out the electrons in order to form an ion-electron beam.

The device for forming a quasi-neutral beam of oppositely charged particles may further comprise the following features, taken alone or as a combination:
- the electro-neutrality of the ion-ion beam is obtained at least partly by adjusting the period of application of the positive and/or negative potentials stemming from the low frequency alternating voltage source;
- the electro-neutrality of the ion-ion beam is obtained at least partly by adjusting the amplitude of the positive and/or negative potentials stemming from the low frequency alternating voltage source;
- the low frequency alternating voltage source is laid out so as to produce a rectangular signal;
- the set of means for forming an ion-ion plasma in the chamber comprises a tank including at least one electronegative gas.

Finally, it should be noted that the gases which may be used may be selected, according to their electropositivity or electronegativity, from among argon (Ar), hydrazine ($N_2H_4$), xenon (Xe), carbon tetrafluoride ($CF_4$), sulfur hexafluoride ($SF_6$), di-iodine ($I_2$), dinitrogen ($N_2$) or dihydrogen ($H_2$).

DESCRIPTION OF THE DRAWINGS

The invention will be better understood and other objects, advantages and features thereof will become more clearly apparent upon reading the description which follows and which is made with reference to the appended figures, wherein:

FIG. 2(*b*) illustrates optimized signal of the device shown in FIG. 2(*a*);

DETAILED DESCRIPTION

Figure 4:
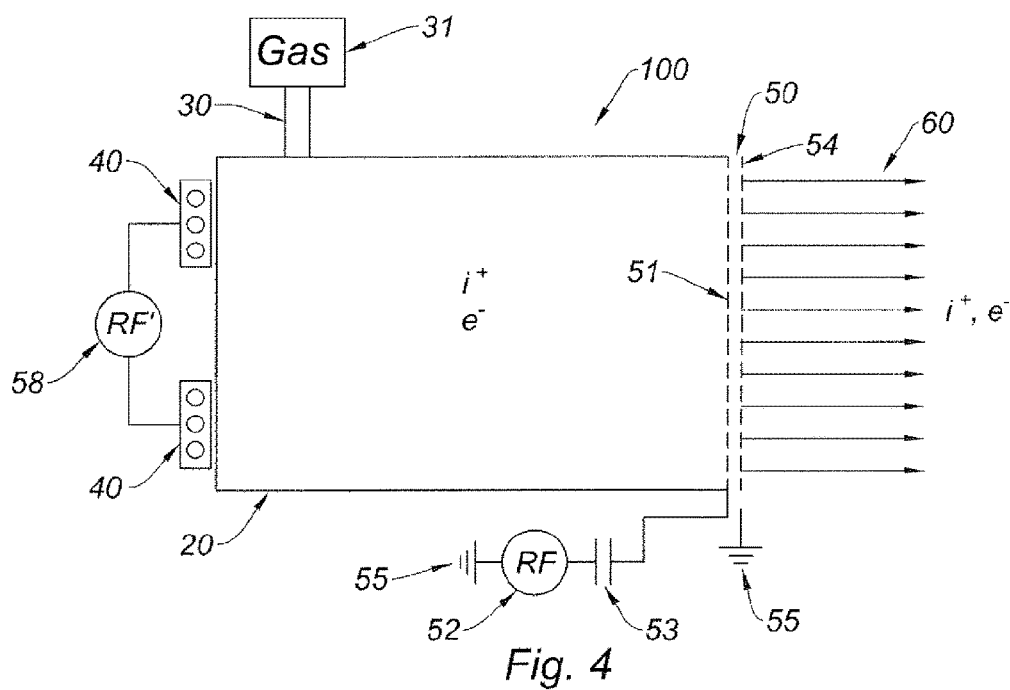
FIG. 4 is a representative diagram of a first embodiment of the invention, with which it is possible to extract and accelerate positive ions and electrons.

A first embodiment of the invention is described hereafter with the support of FIG. 4.

The device 100 comprises a chamber 20 into which may be introduced a gas, for example stored in a tank 31, which may form a plasma including ions and electrons, this introduction being carried out via the means 30, such as a conduit, connected to the tank 31 for introducing this gas into the chamber 20. It also comprises means 40, 58 for ionizing the gas in order to form the plasma. For example, the means 40 may be formed with coils powered by a radiofrequency source 58. Instead, a provision may be made for other means 40, 58 known to one skilled in the art, i.e. as non-limiting examples, a microwave source 58 with a resonator 40 or further a DC current source 58 with electrodes.

The device 100 finally comprises means 50 for extracting and accelerating positive ions and electrons out of the chamber 20. This extraction/acceleration gives the possibility of forming at the outlet of the chamber, a beam 60.

The extraction and acceleration means 50 comprise a set of at least two grids 51, 54 positioned at the end of the chamber 20. A first grid 51 is connected to an alternating voltage source at a frequency comprised in the range of radiofrequencies, designated hereafter as a RF radiofrequency source, 52, via a capacitor. The capacitor 53 is positioned in series with the RF radiofrequency source, 52. A second grid 54 is set to a reference potential 55, for example the ground.

In practice, for certain applications, the reference potential may be the ground. However, for other applications, for example in the field of space, the reference potential may be that of the relevant satellite or probe.

In the following of the description relating to this first embodiment, the reference potential will be, unless indicated otherwise, considered as being the ground.

The RF source, 52 is adjusted for obtaining an angular frequency $\omega_{RF}$ such that $\omega_{pi} \leq \omega_{RF} \leq \omega_{pe}$, wherein $$\omega_{pe} = \sqrt{\frac{e_0^2 n_p}{\varepsilon_0 m_e}}$$

is the plasma angular frequency of electrons and $$\omega_{pi} = \sqrt{\frac{e_0^2 n_p}{\varepsilon_0 m_i}}$$

is the plasma angular frequency of positive ions; with:
$e_0$, the charge of the electron,
$\varepsilon_0$, the vacuum permittivity,
$n_p$, the plasma density,
$m_i$, the ion mass, and
$m_e$, the mass of the electron.

It should be noted that $\omega_{pi} \ll \omega_{pe}$ because $m_i \gg m_e$.

Generally, the frequency of the signal provided by the RF source, 52 may be comprised between a few MHz and a few hundred MHz, depending on the gas used for forming the plasma in the chamber 20 and this, so as to be comprised between the plasma frequency of the ions and the plasma frequency of the electrons.

Figure 5:
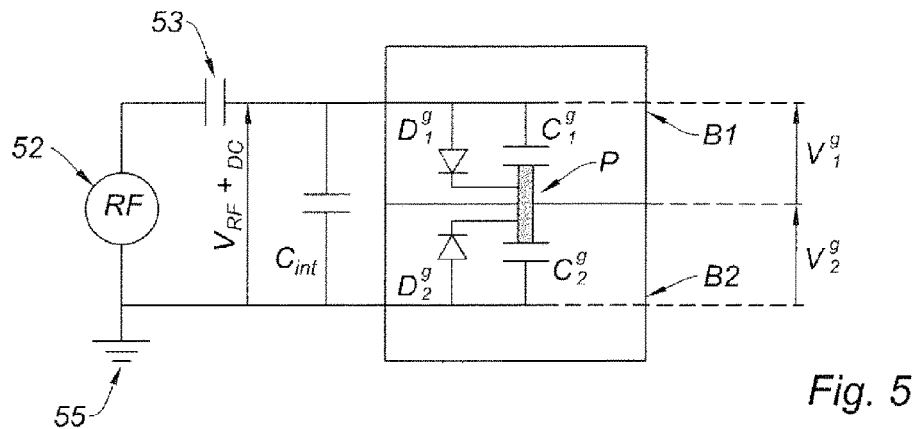
FIG. 5 is an equivalent electric diagram of the device illustrated in FIG. 4.

The device according to the invention illustrated in FIG. 4 may be associated, in a simplified way, with the equivalent diagram of FIG. 5.

On this diagram, the RF source 52 is recognized, the capacitor 53 in series with this source and the ground 55.

The reference P represents the plasma.

$C_{int}$ represents the capacitance between both grids 51, 54.

The block B1 represents the effect of the sheath which is formed between the plasma and the first grid 51, which may be represented by a diode $D_1^g$ in parallel with a capacitance $C_1^g$. The block B2 represents the effect of the sheath which is formed between the plasma and the second grid 54, which may be associated with a diode $D_2^g$ in parallel with a capacitance $C_2^g$.

The existence of a diode function, for each of the blocks B1 or B2, is related to the fact that the ions cannot follow the instantaneous change in the electric field between the grids, imposed by the radiofrequency variation of the signal from the radiofrequency source 52, but only the average value of this field while the electrons may follow the instantaneous change in this electric field. This stems from the fact that the mass of the electrons ($m_e$) is very small with respect to the mass ($m_i$) of the positive ions ($m_e \ll m_i$) and that the frequency of the signal imposed by the source 52 (radiofrequency; angular frequency $\omega_{RF}$) is selected so as to be between the plasma frequency of the ions and the plasma frequency of the electrons, i.e., $\omega_{pi} \leq \omega_{RF} \leq \omega_{pe}$. Consequently, when an RF voltage ($V_{RF}$) is applied via the source 52, the capacitor 53 charges.

This charge of the capacitor 53 then produces a DC voltage at the terminals of the capacitor. Finally, a voltage $V_{RF}$+DC is obtained, on the terminals of the set formed by the RF source, 52, in series with the capacitor (FIG. 5).

The constant portion DC of the voltage $V_{RF}$+DC then gives the possibility of defining the electric field between both grids 51, 54, the average value of the sole signal $V_{RF}$ being zero. This DC value therefore gives the possibility of extracting and accelerating the positive ions through both grids 51, 54, continuously.

Moreover, the capacitances $C_1^g$ and $C_2^g$ are very different because of the layout of the grids 51, 54 in the device. Indeed, from the point of view of the positive ions or electrons present in the plasma, the second grid 54, downstream with respect to the first grid 51, relatively to the direction of propagation of the beam 60, has an effective surface area $S_2^g$ much smaller than the effective surface area $S_1^g$ of the first grid 51 since the second grid 54 is only visible for the plasma through the orifices of the first grid 51, i.e. $S_1^g \gg S_2^g$. This is therefore expressed by the inequality $C_1^g \gg C_2^g$ even for identical grids 51, 54. In practice, the set of both grids 51, 54 therefore gives the possibility of forming a capacitor with asymmetrical surfaces.

Consequently, when an RF voltage ($V_{RF}$) is applied via the source 52, the voltage $V_{RF}$+DC on the terminals of the set formed by the RF source 52 in series with the capacitor 53 is expressed as $V_{RF}$+DC=$V_1^g$+$V_2^g \cong V_2^g$, since $C_1^g \gg C_2^g$, wherein $V_1^g$ represents the potential difference in the sheath formed between the plasma and the first grid 51 and $V_2^g$ represents the potential difference in the sheath formed between the plasma and the second grid 54.

The first grid 51 to which is applied the RF signal, 52, via the capacitor 53 is in contact with the plasma and interacts with the latter. The plasma potential follows the potential imparted to the first grid 51, i.e. $V_{RF}$+DC.

As for the second grid 54, at the ground 55, it is also in contact with the plasma but only during the short time intervals during which the electrons are extracted at the same time as the positive ions, i.e. when $V_2{}^g=V_{RF}$+DC is less than a threshold value $\phi_{CR}$ below which the sheath disappears (sheath collapse).

This threshold value $\phi_{CR}$ is defined by Child's law. This law is expressed in the following way:
Wherein:

$$s = \sqrt{\frac{4}{9}\varepsilon_0 \frac{\phi_{cr}^{3/2}}{j_i} \sqrt{\frac{2e_0}{m_i}}} \quad \text{(Eq. 1)}$$

s, is the thickness of the sheath at which the latter becomes less than the dimension of the orifices of the grid;
$\varepsilon_0$, the permittivity of vacuum;
$e_0$, the charge of the electron;
$m_i$, the mass of an ion; and
$j_i$, the current density of the ions.

Figure 6:
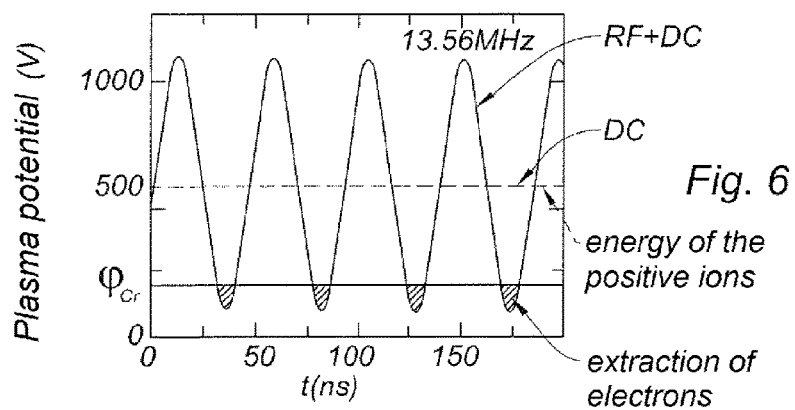
FIG. 6 illustrates an RF voltage signal which is conceivably applied to a grid of the device of FIG. 4 via a capacitor in series with the RF source, this voltage signal substantially corresponds to the plasma potential.

The operation of the device 100 is illustrated in FIG. 6.

FIG. 6 represents an example of the development of the plasma potential versus time, related to the application of an RF voltage, 52, via the capacitor 53 on the first grid 51.

The dotted line represents the constant DC component, here of 550V, which is related to the presence of the capacitor 53. This component defines the energy of the positive ions present in the plasma which are constantly extracted and accelerated by both grids 51, 54.

The plasma potential however varies between extreme values (+1050V; 50V) around the constant component (550V, here) because of the RF signal provided by the source 52.

When the plasma potential attains the critical potential from which the sheath disappears, the electrons are extracted and accelerated through the grids 51, 54 with the positive ions.

Here, $\phi_{CR} \cong 200V$.

This may be obtained with identical grids 51, 54 for which the circular orifices have a diameter of 1.5 mm (gives the possibility of defining the value of s in (Eq. 1)), the distance between both grids being comparable with the diameter of a grid orifice. The gas used is argon. The current density of the ions, associated with these orifices and with this gas, is 5 mA/cm².

In this figure it is noted that the frequency of the plasma is 13.56 MHz, in order to make sure that $\omega_{pi} \leq \omega_{RF} \leq \omega_{pe}$.

The electro-neutrality of the beam 60 at the outlet of the chamber 20 is obtained by extracting the electrons through both grids 51, 54 when the sheath present at the first grid 51 disappears.

Beyond the example associated with FIG. 6, it should be noted that the dimensioning of the grids 51, 54 will therefore depend on the gas used, on the ion current density which one wishes to obtain, according to Child's law.

Generally, identical grids 51, 54 will be used. Each grid 51, 54 may have circular orifices, for which the diameter is comprised between 1 mm and 2 mm. The distance between both grids 51, 54 is then located in the same range of values as the diameter of the orifices.

Alternatively, each grid 51, 54 may have slot-shaped orifices.

Several differences should be noted between the embodiment according to the invention (FIGS. 4 and 5) as compared with the aforementioned article (FIG. 3), both on the level of the structure and of the operation.

Unlike the aforementioned article (FIG. 3), it is not at the level of the grid 54 which is connected to the ground 55 that there is most of the time, an interaction with the plasma and the formation of a sheath with variable thickness.

On the level of the structure, the device 100 according to the invention differs from the device proposed in the article of S. V. Dudin & D. V. Rafalskyki, by the fact that it applies means for extracting and accelerating positive ions and electrons based on two grids 51, 54 located at the outlet of the chamber and not on a single one, cooperating with an electrode at the core of the plasma.

Figure 3:
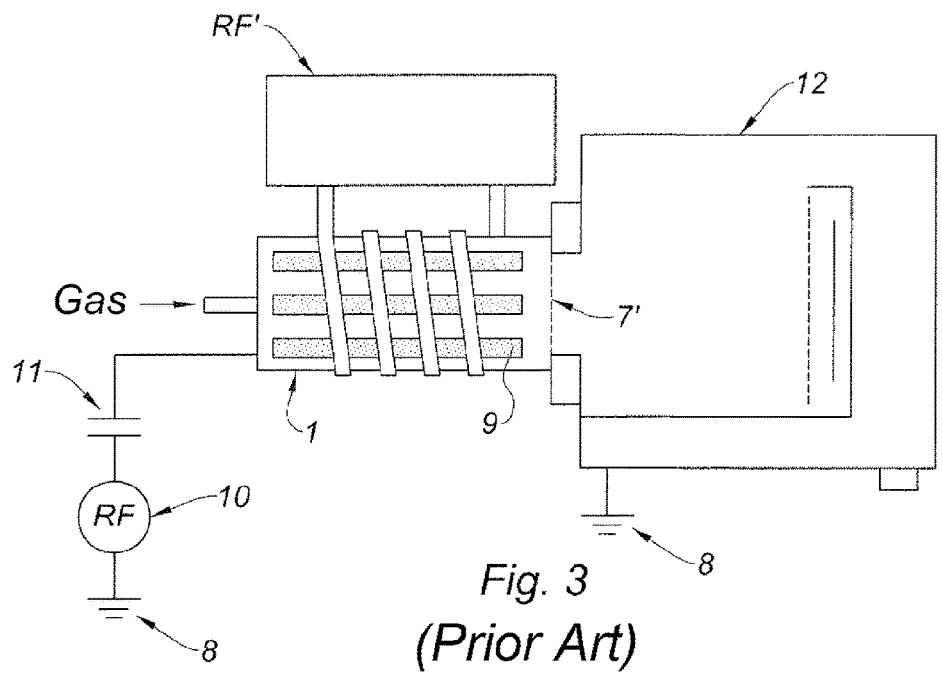
FIG. 3 is a representative diagram of a device in accordance with prior art technology.

On the operating level, the fact of using two grids 51, 54 at the outlet of the chamber modifies the operation of the extraction and of the acceleration, with respect to the aforementioned article (FIG. 3).

Indeed, if a sheath is formed at the first grid 51, for which the thickness varies depending on the plasma potential, the potential difference with the plasma in the sheath is low because the plasma potential follows the potential applied to the first grid 51.

The constant potential difference DC is therefore applied between both grids 51, 54 and not, as this is the case for the aforementioned article at the grid connected to the ground. The acceleration of the positive ions stems from this potential difference DC taking place between both grids 51, 54.

Accordingly, the trajectory of the positive ions is better controlled and much less positive ions will be incident on the first grid 51. These positive ions will no longer be incident on the wall of the second grid 54, which is only visible from the point of view of these ions through the orifices of the first grid 51.

Moreover, when the sheath disappears (plasma potential of less than or equal to the critical potential), the electrons are directed through the orifices of the first grid 51 and also do not have any tendency of hitting the wall of the second grid 54, which is only visible, from the point of view of the electrons, through the orifices of the first grid 51. The trajectory of the electrons is therefore well controlled.

Therefore it is possible to contemplate a device having a clearly improved lifetime or applying positive ions with a greater energy than in the aforementioned article (FIG. 3).

The operation of the extraction and acceleration means formed with an assembly of at least two grids 51, 54 according to the invention also differs from the means with two grids 5', 7' proposed in document WO 2012/042143 (FIG. 3; positive ions—electrons extractions).

Indeed, the alternating signal imparted to the grid 5' is centered on the zero value (absence of any capacitor). No constant component DC therefore takes place in the device between both grids 5', 7', for which the potential difference is only related to the sole variation of the variable signal imparted to the grid 5'. No constant extraction of positive ions is possible in WO 2012/042143, but only a successive extraction of positive ions and of electrons.

Figure 7:
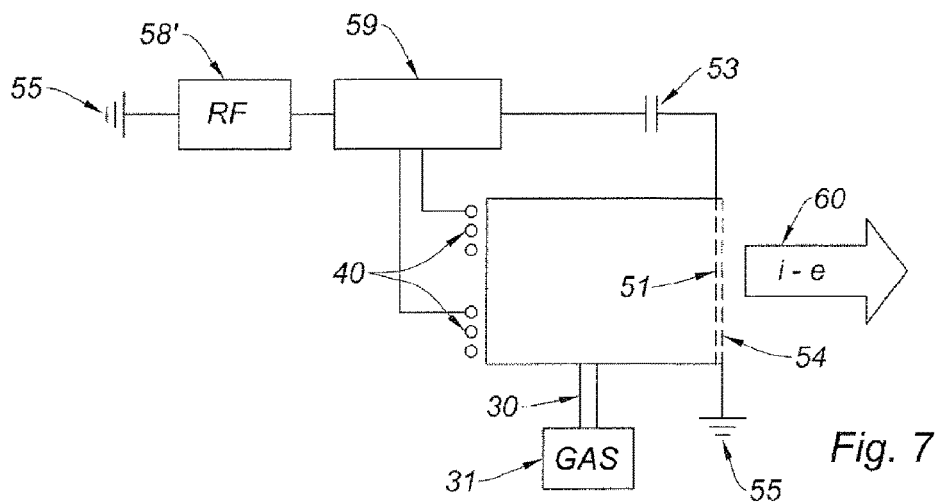
FIG. 7 is an alternative embodiment of the device proposed in FIG. 4.

FIG. 7 illustrates an alternative embodiment of the device 100 illustrated in FIG. 4, wherein the radiofrequency source 52 is not applied. In this case, a radiofrequency source 58' used for activating the means 40, coils for example, is also put to use for powering the grid 51. A means 59 should then be provided for handling the signal provided by said source towards the means 40, on the one hand, for example one or several coils and the grid 51 on the other hand. This design may prove to be of interest for space applications since it reduces the risks of a failure of the whole of the device 100.

In FIGS. 4, 5 and 7, the case when the grid 51 is connected to the RF source, 52 (FIGS. 4 and 5), 58' (FIG. 7) in series with the capacitor 53 and the other grid 54, set to a reference potential, for example ground has been illustrated. In this case, one of the outlets of the RF source, 52 (or 58', in FIG. 7) is set to a reference potential for example the ground. In order to ensure the operation of the device, it is however not very important to know which outlet of the RF source, 52, is connected to which grid 51, 54. In other words, the grid 51 may be set to a reference potential and the other grid 54 connected to the RF source, 52 (FIGS. 4 and 5) or 58' (FIG. 7) in series with the capacitor 53.

Figure 8:
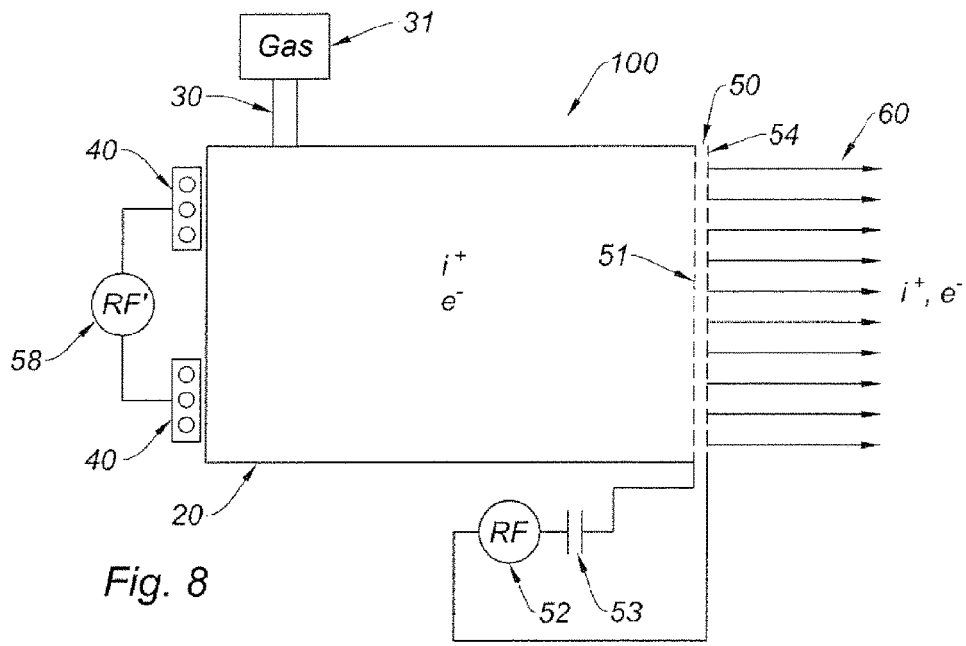
FIG. 8 illustrates another alternative embodiment of the device proposed in FIG. 4.

FIG. 8 illustrates another alternative embodiment of the device 100 illustrated in FIG. 4.

In this alternative, the RF radiofrequency source, 52, is connected to both grids 51, 54. More specifically, the RF radiofrequency source, 52, is positioned in series with the capacitor 53 and connected, through one of its outlets and via this capacitor 53, to one 51 of the two grids 51, 54. In other words, one of the outlets of the RF source, 52 is connected to the capacitor 53, the latter being itself connected to one 51 of the two grids 51, 54. As to the other outlet of the RF source, 52, it is then connected to the other one 54 of the two grids 51, 54. In FIG. 8, it is the grid 51 which is connected to the capacitor 53, but it would be just as well possible to connect the capacitor 53 to the grid 54 and the grid 51 to the outlet of the RF radiofrequency source, 52, which is not connected to the capacitor 53.

Further, it should be noted that such an alternative may be provided for the device 100 illustrated in FIG. 7. In this case, it is the RF radiofrequency source, 58', which is connected to both grids 51, 54, according to the description of the previous paragraph.

This alternative therefore does not imply any reference potential.

In the field of space, such a connection ensures an absence of parasitic currents circulating between the external conductive portions of the satellite or of the space probe on the one hand and strictly speaking the device for extracting oppositely charged particles on the other hand.

Finally, the signal applied to the relevant grid may be a signal obtained at least partly by adjusting the period of application of the positive and/or negative potentials stemming from the RF radiofrequency alternating voltage source, 52, 58', and this, for improving the electro-neutrality of the ion-electron beam. Alternatively or additionally, the signal applied to the relevant grid may be a signal at least partly obtained by adjusting the amplitude of the positive and/or negative potentials stemming from the RF radiofrequency alternating voltage source, 52, 58' and this for improving the electro-neutrality of the ion-electron beam.

This may be a signal of an arbitrary shape, for example a rectangular shape.

Figure 1:
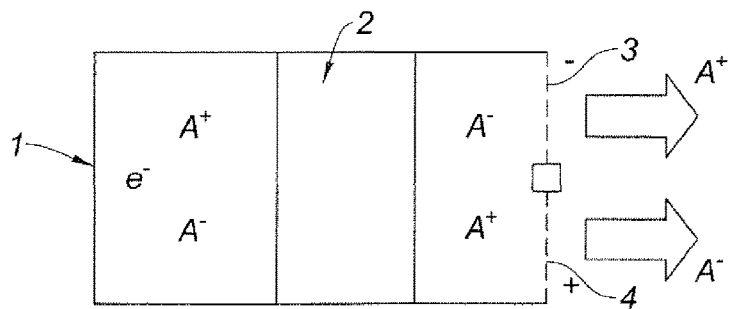
FIG. 1 is a representative diagram of a device proposed in WO 2007/065915 in accordance with prior art technology.
Figure 2A:
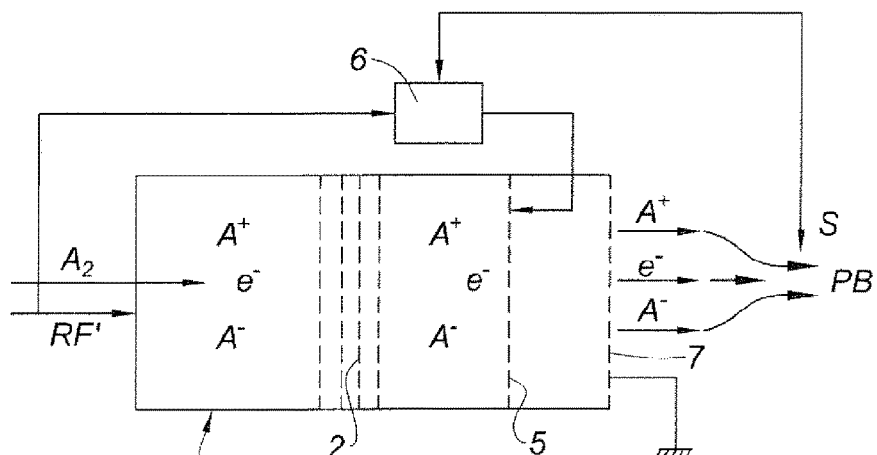
FIG. 2 (*a*) is a representative diagram of a device proposed in document WO 2012/042143 in accordance with prior art technology.
Figure 2B:
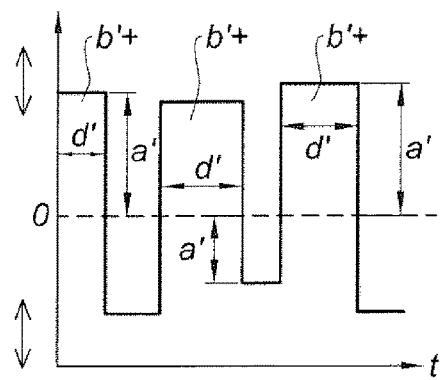

In particular, this may be a rectangular signal as the one illustrated in FIG. 2(b), i.e. a rectangular signal is formed by a sequence of positive (b'+) and negative (b'−) rectangular pulses with variable amplitude (a') and duration (d'). The adjustment is thus carried out both on the period of application of the positive and negative potentials and on the amplitude of these potentials.

Alternatively, this may be a sign-wave signal.

Figure 9:
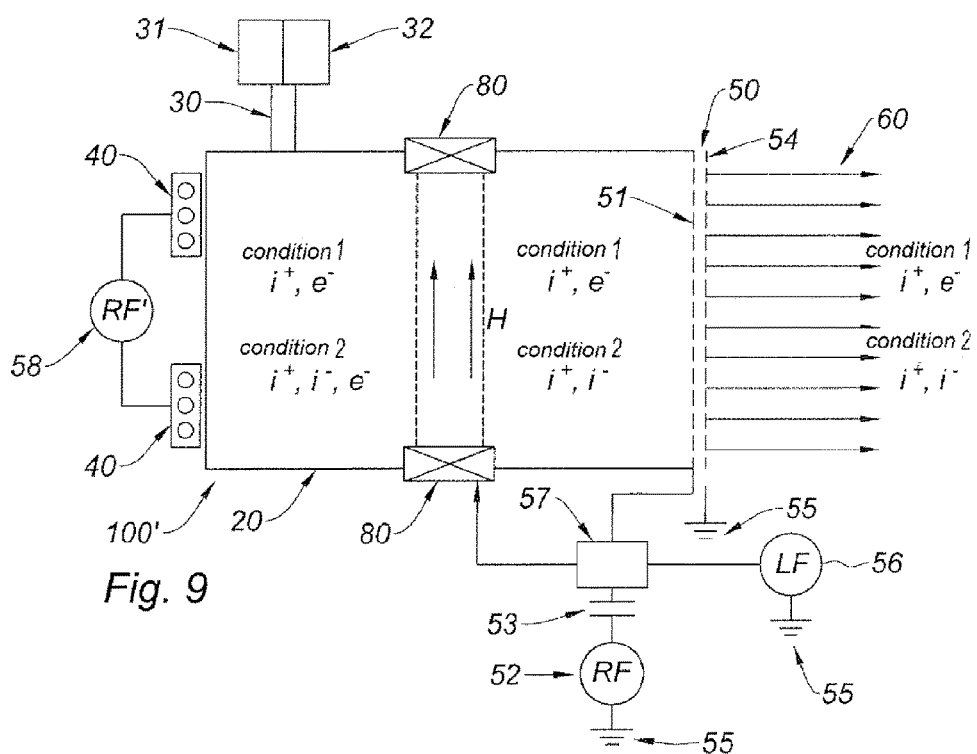
FIG. 9 is a representative diagram of a second embodiment of the invention, with which it is possible to extract and accelerate either positive ions and negative ions or positive ions and electrons on the other hand.

A second embodiment is described hereafter supporting FIG. 9. This second embodiment may apply two operating modes, one giving the possibility of forming a quasi-neutral beam of ions and electrons as oppositely charged particles, the other one giving the possibility of forming a quasi-neutral beam of positive ions and of negative ions or ions-ions, as oppositely charged particles.

The device 100' comprises the set of means applied in the device 100 according to the first embodiment.

However, the device 100' further comprises a set of means 32, 30, 40, 58, 80 for forming an ion-ion plasma in the chamber 20.

As compared with the means provided in the device 100 for forming an ion-electron plasma, the means 32, 30, 40, 58, 80 notably comprise a tank 32 including at least one electronegative ionizable gas, able to generate positive and negative ions as well as electrons, and a means 80 for filtering out the electrons produced by this electronegative gas. The means 80 preferably produces a constant magnetic field H, transversely oriented with respect to the direction of displacement of the ions and of the electrons in the chamber 20.

The device 100' also comprises a so called LF lower frequency alternating voltage source, 56, able to be connected to the first grid 51 via a controllable means 57 so as to be positioned either on the RF radiofrequency source, 52, or on the LF low frequency source, 56. By low frequency LF source, 56, is meant a source emitting in a frequency of less than or equal to the plasma frequency of the ions. It should be noted that the means 57 also gives the possibility of activating or deactivating the filtering means 80.

The signal from this LF low frequency alternating voltage source, 56, may be obtained at least partly by adjusting the period of application of the positive and/or negative potentials from this source and this, for controlling the electro-neutrality of the ion-ion beam. Alternatively or additionally, the signal from this LF low frequency alternating voltage source, 56, may be obtained at least partly by adjusting the amplitude of the positive and/or negative potentials from this source and this in order to improve the electro-neutrality of the ion-ion beam.

This may notably be a rectangular-shaped signal such as the one which is illustrated in FIG. 2(b), i.e. a rectangular signal formed by a sequence of positive b'+ and negative b'− rectangular pulses with variable amplitude a' and period d'. The adjustment is thus carried out both on the period of application of the positive and negative potentials and on the amplitude of these potentials.

More generally, a rectangular-shaped signal may be contemplated.

The device 100' therefore has two operating modes.

In the first operating mode, the means 57 is positioned on the RF source, 52, in series with the capacitor 53. A gas able to generate a plasma including positive ions and electrons is introduced into the chamber 20, via the tank 31 and the conduit 30. The magnetic filtering means 80 for the electrons is disabled, with the means 57 of which are also controlled the activation or the deactivation of this filtering means 80. The operation of the device 100' is identical with the one which was described for the first embodiment (device 100) for extracting positive ions and electrons.

In the second operating mode, the means 57 is positioned on the LF source, 56, and also gives the possibility of activating the filtering means 80. The LF source, 56, emits a signal, the value of which is successively positive and negative at a frequency of less than or equal to the plasma frequency of the ions, in order to successively extract the positive ions and the negative ions. An electronegative gas has to be introduced into the chamber 20. The means 80 for filtering out the electrons has to be activated in order to remove or quasi-remove the electrons and to only obtain at the outlet of this means 80 quasi-only the positive ions and the negative ions.

The electro-neutrality of the beam obtained at the output is ensured.

To the knowledge of the applicant, no plasma generator device proposes such an all-in-one device. In particular, when the device 100' is used in an ion-ion mode, its use overtime may be limited, by passing into a positive ions-electrons mode, in order to avoid early ageing problems of the equipment.

In FIG. 9, it is noted that two distinct RF sources 58, 52 are applied. For this, it is also possible to provide a facility diagram compliant with the one which is illustrated in FIG. 8 for the device 100', i.e. single RF source.

Finally, and generally, the gases which may be used in the devices 100 or 100' may be selected, according to their electropositivity or electronegativity, from among argon (Ar), hydrazine ($N_2H_4$), xenon (Xe), carbon tetraflouride ($CF_4$), sulfur hexafluoride ($SF_6$), di-iodine ($I_2$), di-nitrogen ($N_2$) or dihydrogen ($H_2$).

Tests were conducted so as to show the benefit of the solution proposed within the scope of the invention.

Figure 10:
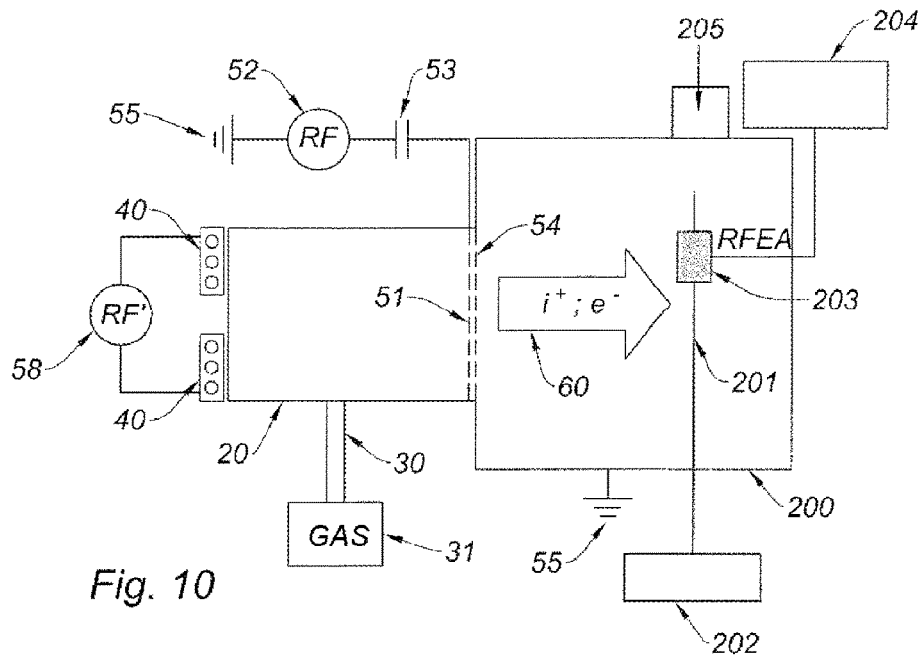
FIG. 10 is a diagram of a test facility giving the possibility of testing the device according to the invention which is compliant with that of FIG. 4.

FIG. 10 is a representative diagram of a test facility used with the device 100 according to the invention. On the left portion of this FIG. 10, the device 100 illustrated in FIG. 4 is recognized.

The characteristics of the beam 60 are determined in a chamber 200 in vacuo, via a pump 205. The measurement is conducted by means of a target 201 with which is associated an energy analyzer 203 positioned on the target 201, this analyzer being connected to a processing means 204. This analyzer is known under the acronym of RFEA ("Retarding Field Energy Analyzers"). The target 201 is connected to a means for determining its potential 202.

Figure 10A:
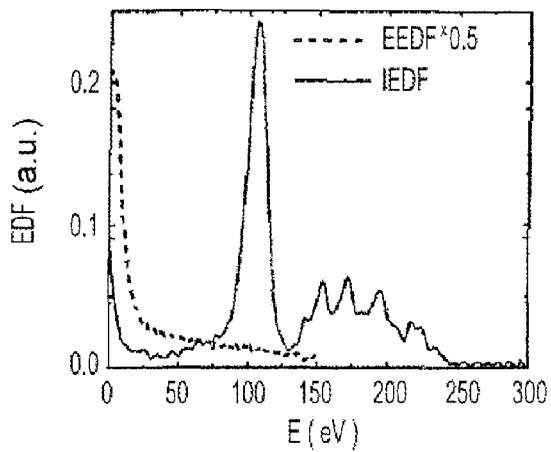
FIGS. 10(a) to 10(c) show a few results of measurements obtained with the test facility of FIG. 10 in the case of ion-electron condition.
Figure 10B:
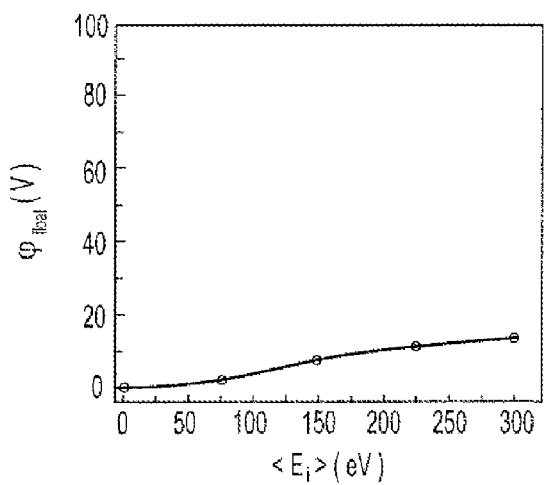
Figure 10C:
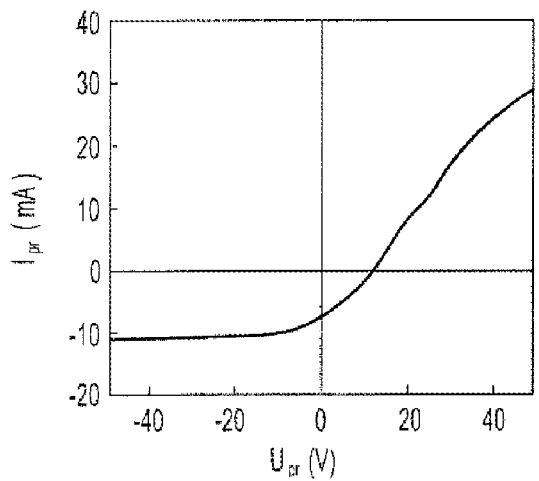

A few results are provided in FIGS. 10(a) to 10(c) relating to the ions-electrons operation.

The gas used is argon (25 sccm).

The frequency of the RF source, 52, is 4 MHz. The potential applied to the grid 51 by this source may have an amplitude comprised between 0 and 300V (i.e. up to 600V peak to peak).

The magnetic filter is not active.

FIG. 10(a) illustrates the energy distribution functions (EDF; ordinates: arbitrary unit a.u.) for argon ions (IEDF) and electrons (EEDF) versus the energy of these ions/electrons (abscissas). The presence of a peak both for the electrons and the ions show that the extraction and acceleration of both types of charged particles are achieved. This figure shows that the ions are extracted and accelerated at an average energy of 150 eV, and the electrons at an average energy of 10 eV. These measurements are obtained with an RF potential of amplitude 150V (300V peak to peak).

FIG. 10(b) shows the development of the potential of the target 201 (ordinates; $\phi_{float}$) depending the average energy of the argon ions. It is noted that on the relevant energy range of the argon ions for this measurement (0 to 300 eV), the potential of the target is less than 15V, which is low relatively to the energy of the ions. In other words, this shows that the beam is well compensated as regards the charge (ensured electro-neutrality).

FIG. 10(c) shows a potential-current curve ($U_{pr}/I_{pr}$) of the target 201; for an energy of argon ions of 300 eV. These argon ion and electron currents are identical ($I_{pr}=0$) when the potential of this target is 15V. It should be noted that $\phi_{float}$ has the value $U_{pr}$ when $I_{pr}=0$.

Figure 11:
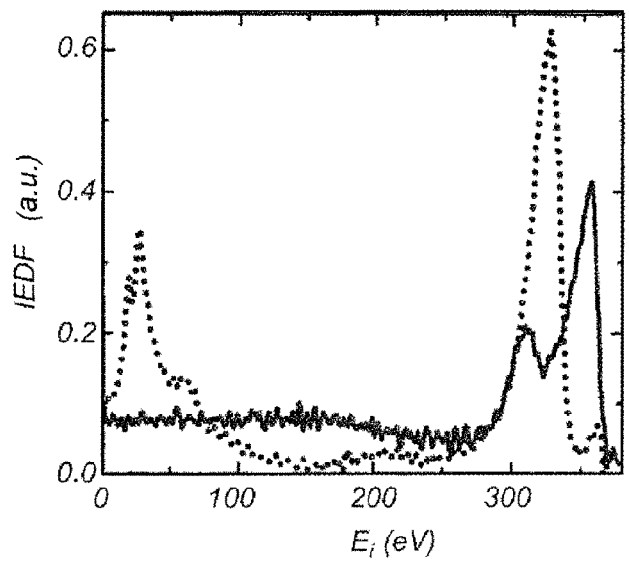
FIG. 11 provides results of measurements obtained with the device compliant with that of FIG. 9, with the measurement means illustrated in FIG. 10.

FIG. 11 shows results relating to the ion-ions operating mode. These results were obtained with a test facility applying the device 100' illustrated in FIG. 9, with measurement means for characterizing the beam 60 from this device 100' which were described earlier in supporting FIG. 10.

The gas used is sulfur hexafluoride ($SF_6$).

The LF frequency of the voltage source 56 is 20 kHz. The potential applied to the grid connected to the voltage source 56 is comprised between −350V and +350V.

The magnetic filter 80 is active, in order to remove or quasi-remove the electrons produced by ionization of the gas.

FIG. 11 more specifically illustrates the energy distribution functions (IEDF; ordinates; arbitrary unit a.u.) for positive ions (solid lines) and negative ions (dotted lines) according to the energy of these ions (abscissas). The presence of a peak both for the electrons and for the ions shows that extraction and acceleration of both types of charged particles are achieved. This FIG. 11 shows that the positive and negative ions are extracted and accelerated at an average energy of more than 300 eV.

The devices 100, 100' according to the invention may notably be used for:
plasma thrusters (application to satellites for correcting a trajectory, to space probes, . . . ),
devices for depositing particles on a target (vapor deposition, for example; the field of microelectronics),
devices for etching the target,
devices for treating polymers or further devices for activating the targeted surface.

The invention claimed is:

1. A device for forming a quasi-neutral beam of ions and electrons, comprising:
a chamber,
a set of means for forming an ion-electron plasma in the chamber;
means for extracting and accelerating charged particles of the plasma out of the chamber to form said beam, said means for extracting and means for accelerating comprising a set of at least two grids located at one end of the chamber;
a radiofrequency alternating voltage source adapted for generating a signal the radiofrequency of which is comprised between the plasma frequency of the ions and the plasma frequency of the electrons, said radiofrequency voltage source being positioned in series with a capacitor and connected, through one of its outlet and via this capacitor, to at least one of the grids of said set of at least two grids, at least one other grid of said set of at least two grids either being set to a reference potential, or connected to the other one of the outlets of the radiofrequency voltage source.

2. The device of claim 1, wherein the set of means for forming the ion-electron plasma comprises one or several coils powered by the radiofrequency alternating voltage source.

3. The device of claim 2, wherein the radiofrequency voltage source powering said or each coil is the same as the radiofrequency voltage source in series with the capacitor which are connected to at least one of the two grids, the device further comprising a means for handling the signal provided by said source towards said or each coil on the one hand and towards said at least one grid on the other hand.

4. The device of claim 1, wherein the set of means for forming the ion-electron plasma in the chamber comprises a tank including at least one electropositive gas.

5. The device of claim 1, wherein the grids have circular orifices, the diameter of which is comprised between 0.5 mm and 10 mm, for example between 1 mm and 2 mm.

6. The device of claim 1, wherein the distance between both grids is comprised between 0.5 mm and 10 mm, for example between 1 mm and 2 mm.

7. The device of claim 1, wherein the grids have slot-shaped orifices.

8. The device of claim 1, wherein the electro-neutrality of the beam of ions and electrons is at least partly obtained by adjusting the period of application of the positive and/or negative potentials stemming from the radiofrequency alternating voltage source.

9. The device of claim 1, wherein the electro-neutrality of the beam of ions and electrons is obtained at least partly by adjusting the amplitude of the positive and/or negative potentials stemming from the radiofrequency alternating voltage source.

10. The device of claim 1, wherein the radiofrequency alternating voltage source is laid out so as to produce a rectangular signal.

11. The device of claim 1, wherein the radiofrequency alternating voltage source is laid out so as to produce a sign-wave signal.

12. A device for forming a quasi-neutral beam of oppositely charged particles, comprising:
    the device of claim 1 for forming a quasi-neutral beam of ions and electrons;
    a set of means for forming an ion-ion plasma in the chamber, the set including a means for filtering out the electrons;
    a so called low frequency alternating voltage source which is adapted for generating a signal, the radiofrequency of which is less than or equal to the plasma frequency of the ions;
    a means able to connect one of the grids either to the low frequency voltage source while activating the means for filtering out the electrons in order to form an ion-ion beam, i.e., at the radiofrequency voltage source in series with the capacitor while deactivating the means for filtering out the electrons in order to form an ion-electron beam.

13. The device of claim 12, wherein the electro-neutrality of the ion-ion beam is at least partly obtained by adjusting the period of application of the positive and/or negative potentials stemming from the low frequency alternating voltage source.

14. The device of claim 12, wherein the electro-neutrality of the ion-ion beam is at least partly obtained by adjusting the amplitude of the positive and/or negative potentials stemming from the low frequency alternating voltage source.

15. The device of claim 14, wherein the low frequency alternating voltage source is laid out so as to produce a rectangular signal.

16. The device of claim 12, wherein the set of means for forming an ion-ion plasma in the chamber comprises a tank including at least one electronegative gas.

17. The device of claim 12, wherein the gases which may be used are selected, according to their electropositivity or electronegativity, from among argon (Ar), hydrazine (N2H4), xenon (Xe), carbon tetrafluoride (CF4), sulphur hexafluoride (SF6), di-iodine (I2), dinitrogen (N2), or dihydrogen (H2).

* * * * *